Patented Oct. 12, 1926.

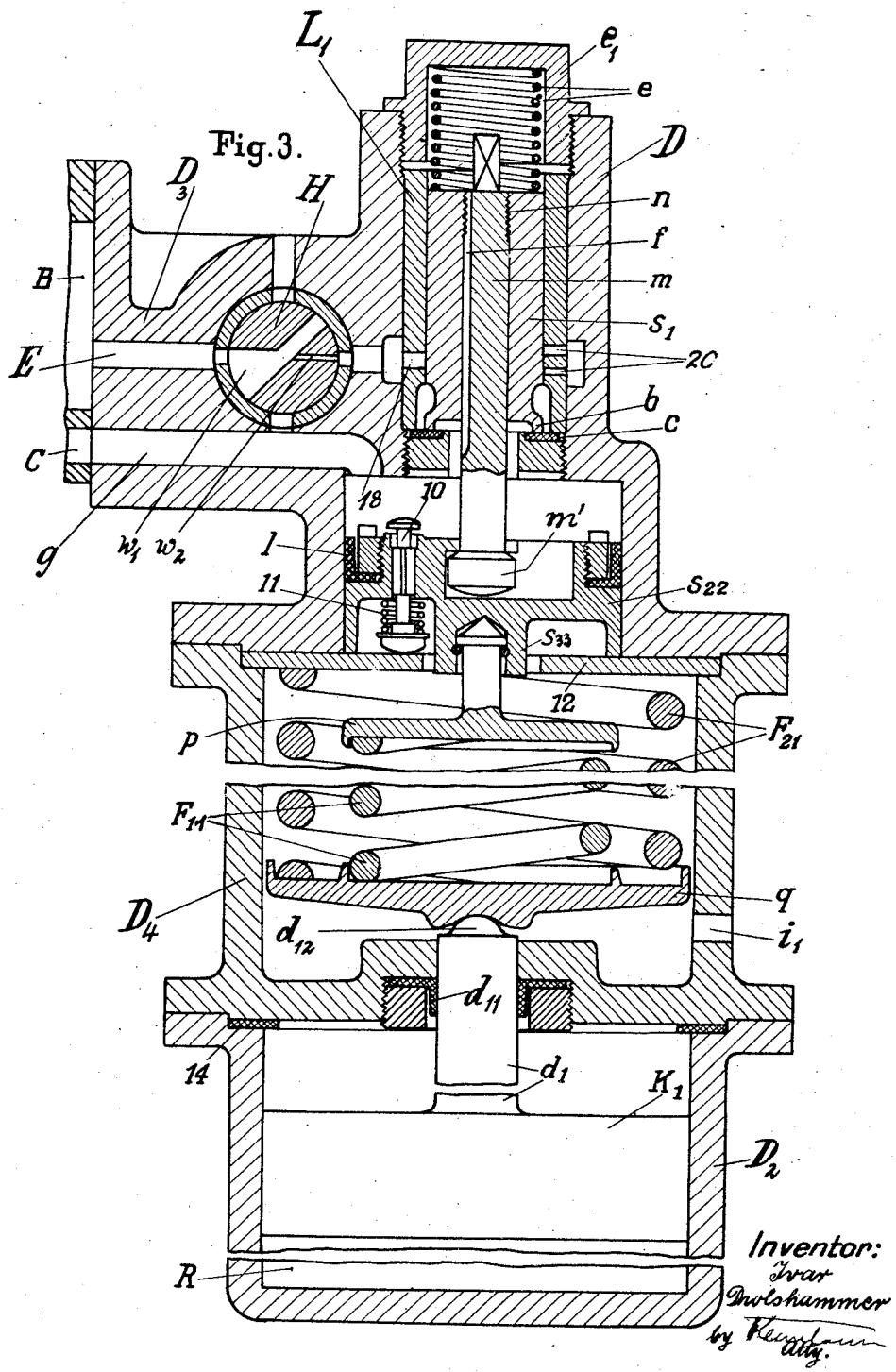

1,602,656

UNITED STATES PATENT OFFICE.

IVAR DROLSHAMMER, OF DRAMMEN, NORWAY.

COMPRESSED-AIR BRAKE.

Application filed August 27, 1925, Serial No. 52,833, and in Germany September 8, 1924.

My invention relates to a compressed-air brake and it is an object of my invention to provide a brake of the kind described which can be operated at any pressure in the pipe system. To this end I provide a regulating valve, the position of which is determined by the pressure in the brake cylinder, in the train pipe and in a reservoir, the pressure in which is equal to the initial pressure which exists in the system when the brakes are at "full release", so that the valve is operated into a position which is determined by the reduction of pressure in the train pipe, independently of the initial pressure.

In hitherto commonly employed pneumatic brakes of types such as Kunze-Knorr, Knorr or Westinghouse, the engine driver is enabled to control the train with a lower pipe pressure than the usual normal pressure of 5 atmosphere established in practice, because the brake is applied whenever the pipe pressure, obtaining for the time being, diminishes. Whether the required pipe pressure and consequently the required brake power be available or not is thus entirely dependent upon the human factor. Negligence, defective working of the air compressor or leakages may be the causes whereby the pressure in the pipes is reduced to such an extent that no air at all may be available for repeated application or release of the brakes.

This invention relates to a new brake device which is adapted to function under any pressure in the pipes, permits upward or downward adjustment of the pressure, and is inexhaustible, while moreover the pressure in the cylinder, irrespective of the length of piston stroke, possible leakages or the like, is reliably determined by the degree of pipe pressure. Should pressure in the auxiliary reservoir fall below the pressure in the pipes it will automatically be restored during the brake application directly from the pipes without the intermediary of the control members of the brake valve.

The new brake device may further be used in connection with other known apparatus for rapidly spreading a decrease in pressure throughout the pipes, proportioning of brake power to the given load on the vehicles, influencing the pressure diagram, adjusting the periods of air admission or the like.

This is attained by subjecting the control piston of the brake valve to the influence of (1) the pressure in the brake cylinder, (2) the pressure in the pipe system, and (3) the pressure in an auxiliary chamber, which latter pressure is equal to the initial pipe pressure under conditions of released brake, in such a manner that the control piston, irrespective of the initial pipe pressure, is moved under the influence of decreasing pressures into predetermined positions corresponding to relative pressures in the pipe system, thereby actuating by means of an interposed spring the member controlling air admission and exhaust, so that compressed air is supplied to the brake cylinder while, after a predetermined cylinder pressure has been attained, the said control member, which itself may be constructed as or connected to a pressure device (piston, diaphragm), is caused to return to its original "neutral" position and thereby to establish equilibrium.

In the drawings affixed to this specification and forming a part thereof, devices embodying my invention are illustrated diagrammatically by way of example.

In the drawings—

Figs. 2 and 3 are similar sections on a larger scale, partly broken away, showing each a device in which the equalizing piston is dispensed with and the regulating valve is subdivided into two units.

Figure 1:
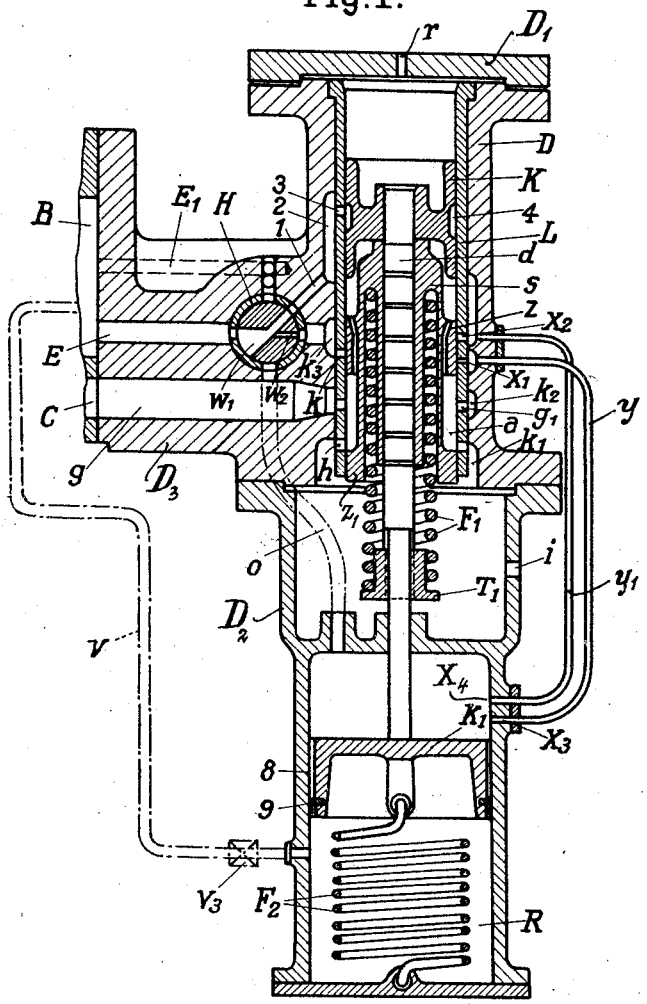
Fig. 1 is a longitudinal section of a device comprising a control piston, an equalizing piston and a regulating piston valve.

Referring now to Fig. 1, the device comprises two coaxial casings, D and $D_2$, which are connected by a flange. $D_3$ is a pipe cast integral with the casing D. The auxiliary air reservoir B and the brake cylinder C which are shown broken away in Fig. 1, are secured to said pipe and connected with the passages formed therein. The casing D is fitted with a liner L and closed by a cover $D_1$ perforated at $r$. Ports 3, $k$, $x_1$, $x_2$ and $h$ are formed in the liner L and adapted to cooperate with recesses 2, $k_3$, $k_2$ and $k_1$ in the casing D. H is a cock provided with a wide passage $w_1$ and a restricted passage $w_2$, and E, $E_1$ $l$, and $g$ are passages in the pipe $D_3$ which are connected or disconnected in accordance with the position of the cock H. The cock H and its connections form no part of the present invention and are therefore not described in detail.

K is an equalizing piston having an angular recess 4 which is adapted to cooperate with the port 3 in the liner L, and $d$ is the rod of the piston K. A washer $T_1$ is secured, and a piston valve $s$ is free to slide on said piston rod $d$ and held against the lower face of the equalizing piston H by a spring $F_1$ inserted between the piston valve and the washer $T_1$. The piston valve $f$ is provided with a longitudinally perforated piston $z$ intermediate its ends and a solid piston $z_1$ at its lower end, said piston valve being adapted to control the ports $x_1$, $x_2$, $k$, $g_1$ and $h$, its recess $a$ being adapted to connect said ports.

A cylinder is formed in the lower end of the casing $D_2$ into which extends the piston rod $d$ of the equalizing piston K, and a piston $K_1$ is secured on the lower end of said rod. The upper end of the cylinder is connected with the pipe system by a passage $o$ and its lower end, below the piston $K_1$ is filled with compressed air, the pressure of which is equal to the initial pressure in the pipe system when the brake is released. When the pipe system is charged with compressed air such air will flow to the upper end of the cylinder $D_2$ through the passage $o$. A packing 9 of L-section is provided on the skirt of the piston $K_1$ and grooves 8 permit the compressed air access to the packing 9. When the pressure above the piston exceeds that below it, the air from above will make its way past the packing 9 and enter the chamber R. But, on the other hand, when the pressure in the pipe system and above the piston $K_1$ is reduced, the packing 9 is forced against the wall of the cylinder by the excess pressure in the chamber R, preventing escape of air from said chamber. A spring $F_2$ is secured to the bottom of the chamber R at one end and to the piston $K_1$ at the other end.

If desired a pipe $v$ may be provided connecting the chamber R with the auxiliary reservoir B, a non-return valve $v_3$ being inserted in said pipe, so that air can flow from the auxiliary reservoir B to the chamber R if for any reason the pressure in the chamber should drop below the pressure in the auxiliary reservoir B.

The ports $x_1$, $x_2$ in the liner L register with corresponding recesses in the casing D and pipes $y$, $y_1$ extend from said recesses to ports $x_3$ and $x_4$, respectively, in the wall of the cylinder in which the piston $K_1$ is reciprocating. The recess $k_1$ is connected with a chamber in the casing $D_2$ above the cylinder of the piston $K_1$ from which a passage $i$ opens into the atmosphere.

In the position of parts illustrated in Fig. 1, the brake, which is assumed to be a single chamber brake, is released. When the brake valve is gradually placed in the "full release" position air from the main reservoir which may be at a pressure of 8 atmospheres, is admitted to the pipe system and, through the passage $E_1$, to the auxiliary reservoir B, the pressure having been reduced to say 5 atmospheres. Compressed air from the pipe system also flows through the passage $o$ to the cylinder of the piston K, and past the packing 9, which may be a leather washer, to the chamber R so that the pressures above and below the piston $K_1$ are equalized. It will be understood that instead of an L-shaped washer 9 which is held against the wall of the cylinder by the excess pressure in the chamber R, a perforation in the piston might be provided which is closed by a flat washer held against it by the excess pressure in the chamber R.

When the pressure in the pipe system is reduced, the communication between the chambers above and below the control piston $K_1$ is interrupted by the packing 9, as described, and the piston moves upwardly until the difference of the pressures above and below the piston is balanced by the tension of the spring $F_2$. It will be understood that the position of the control piston $K_1$ is determined independently of the initial pressure in the pipe system and it makes no difference whether such pressure is, say, 5 or, say, 3 atmospheres, the position of the control piston being exclusively determined by the difference of pressures above and below the piston, that is by the difference between the initial pressure in the chamber R and the reduced pressure in the pipe system.

Assuming for example that the maximum pressure in the brake cylinder C is attained, as usually, when the pressure in the pipe system is decreased for 1.25 atmospheres and assuming that the diameter of the control piston $K_1$ be 100 mms. and its stroke 40 mms., the tension spring $F_2$ must be of such a strength that, with the said decrease of pressure it balances, under an expansion of 40 mms., the power of the control piston $K_1$, which is $$\frac{10^2 \pi}{4} 1.25 = 98.5 \text{ kg.}$$

The tension of the spring is adjusted to counteract when the brake is off the friction of the valve members and to maintain them in the positions shown in the drawing.

Concurrently with a pressure decrease in the pipes, the back flow of air from the auxiliary chamber B to the pipes is prevented in known manner by means of a non-return valve, (not shown). The control piston $K_1$ together with the piston rod $d$, the spring washer $T_1$ and the piston K are moved slightly in an upward direction until the difference in the pressures acting from the opposite sides on the control piston K, equals the tension of the spring $F_2$. In such displacement of the pistons $K_1$ and K the piston valve $s$ is caused to follow by the tension of said piston valve. The exhaust ports $h$ are closed by the piston $z_1$, so that the outflow of air from the brake cylinder C through the passage $g$ and the recess $k_2$ and the port $g_1$ is arrested; and at the same time the piston $z$ of the piston valve $s$ connects the ports $g_1$ with the port $k$ and the passage E from the auxiliary reservoir B. The compressed air from the reservoir now flows through the passage E, the wide passage $w_1$ in the cock H and the passage 1 to a recess 2 in the casing D and a port 3 in said casing to an angular recess 4 in the equalizing piston K. From this recess the air flows through a further port in the liner L arranged on a level with the port 3 and communicating with the recess $k_3$ by a passage, said port and said passage being not shown. From the recess $k_3$ the air flows by ports $k$ through the angular recess $a$ of the piston valve $s$ and the ports $g_1$ in the liner L to the brake cylinder C and also into the space between the piston valve $s$ and the equalizing piston K through the passages in the piston $z$ of the piston valve. At the same time air is admitted directly to the recess $k_3$ through the comparatively narrow passage $w_2$ of the cock H which is connected with the wider passage $w_1$ of said cock. It will be understood that in this manner the compressed air flows to the brake cylinder on two routes, one of said routes having wide sections and the other route being restricted in section.

As mentioned, the cock H and the passages which it controls and the functions in so doing form no part of the present invention.

At the same time the piston $z$ lays open the passage $x_1$ so that compressed air flows from the space above the piston $K_1$ and the pipe system to the brake cylinder C through the recess $a$ of the piston valve, the ports $g_1$ and the passage $g$. In this manner the reduction of pressure in the pipe system is rapidly and uniformly distributed throughout the pipe system and the brakes of the vehicles at the end of the train are actuated almost at the same time as those of the vehicles at the front end of the train. The second set of ports $x_4$ and the pipe $y_1$ is provided as an auxiliary connection in case the piston $K_1$ should move beyond the port $x_3$.

When the driver places the brake valve in the neutral position, so that the pressure in the pipe system is no longer reduced, the control piston $K_1$ is immediately arrested in the position determined by the pressure decrease, while pressure air from the auxiliary reservoir and from the pipe system can flow to the brake cylinder only until the reaction of air pressure in the brake cylinder upon the piston valve $s$ is balanced by the tension of spring $F_1$ resulting from the displacement of the piston valve $s$. The piston valve $s$ will therefore be moved back to a position in which it again closes the ports $k$ and $x_1$ (shut off position). A further even slight decrease of pressure in the pipe system will cause the same operations to be repeated and thereby increase pressure in the cylinder.

If the driver desires to diminish the action of the brake, he slightly raises the pressure in the pipe system. Corresponding to the increase in the pressure the piston $K_1$ is caused to move downwardly. The piston valve $s$ follows this movement as it is balanced on the piston rod $d$ by the pressure in the brake cylinder C and the tension of the spring $F_1$ until its piston $z_1$ lays open the ports $h$ and allows part of the air from the brake cylinder C to escape through $k_1$ and $i$. If the pressure in the pipe system is not further increased, the control piston $K_1$ ceases to move immediately. Air is allowed to escape from the brake cylinder B only until the tension of the spring $F_1$ overcomes the thrust on the piston valve $s$ due to the pressure in the brake cylinder and returns said piston valve into its initial position in which the ports $h$ are closed.

If the pressure in the pipe system is further increased a similar operation will be performed. The device enables the action of the brake to be varied to any desired degree by alternately applying and releasing the brake. Each reduction of pressure in the pipe system brings about a definite pressure in the brake cylinder which is independent of the length of the piston stroke and any leakage past the piston in the brake cylinder, the piston valve $s$ and other parts. The brake will only be fully released if the pressure in the pipe system has obtained the initial pressure which existed before the brake was applied.

The auxiliary reservoir B is automatically supplied with air from the pipe system through non-return valves as described in my U. S. Patent No. 1,527,17, when the pressure in said reservoir drops below the existing pressure in the system. When the brake is fully released the auxiliary reservoir will be completely re-charged.

The pipe $v$ which connects the chamber R to the casing $D_2$ with the auxiliary reservoir B allows the control piston $K_1$ to return to its "full release" position in the case of an emergency application or parting of the train only when there is absolutely no pressure in the brake cylinder, in the auxiliary reservoir B and in the chamber R.

Figure 2:
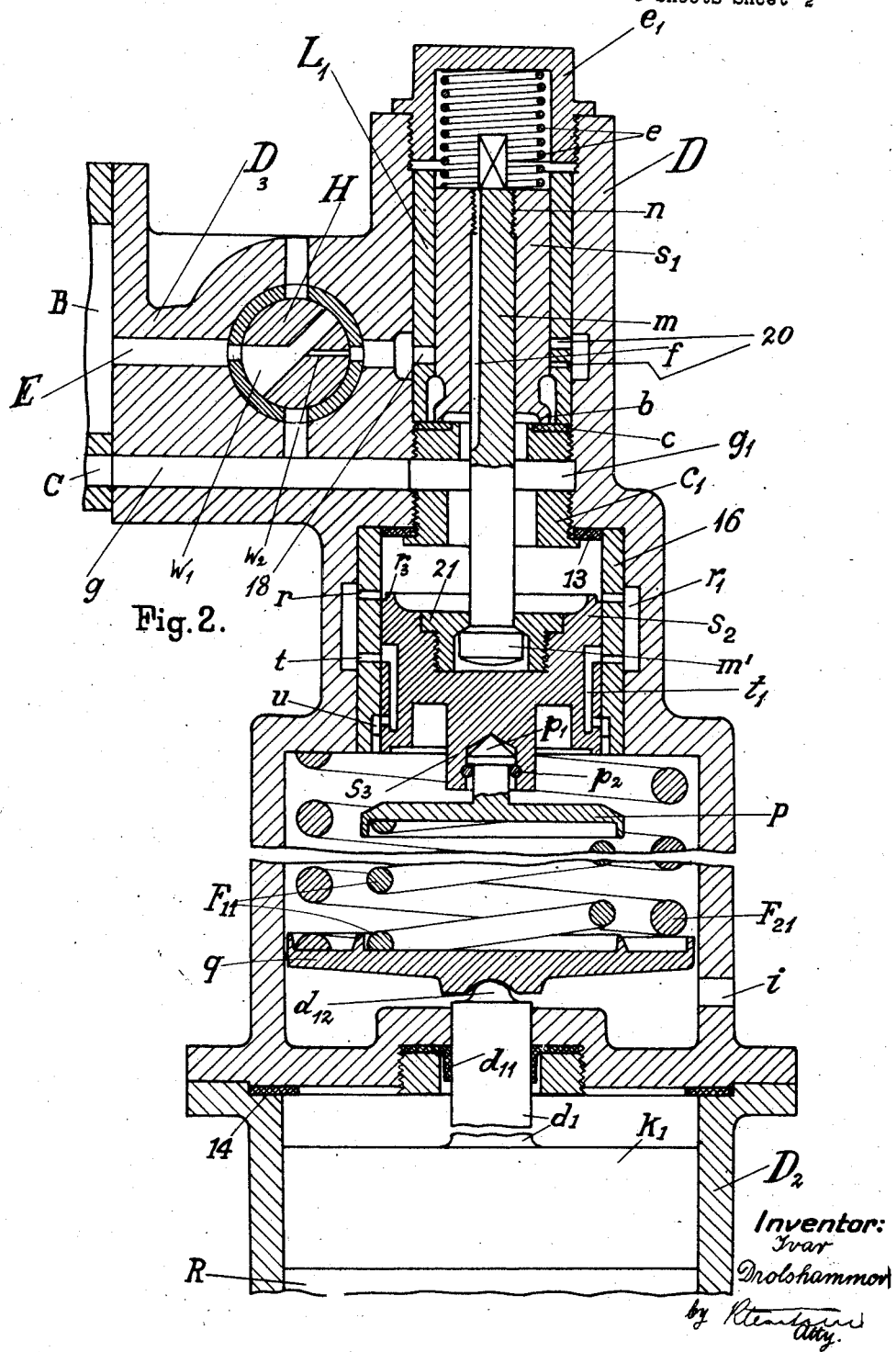

The modifications illustrated in Figs. 2 and 3 are based upon the following considerations:

A slide valve is required for performing the several operations, for valves of other types cannot be used in the present case. In order to reduce the power required for moving such slides to a minimum they should be piston valves. However, piston valves involve the drawback that they always allow a slight amount of air to flow past the edges of the inlet ports so that the pressure in the brake cylinder gradually increases until it has been so increased as to push back the piston valve, opening the outlet passages and allowing the excess air to escape. It will be understood that this loss of compressed air is a serious drawback.

In order to overcome this, I subdivide the piston valve $s$ illustrated in Fig. 1 into two units, an inlet and a discharge unit, and I connect said units with some play, this play permitting the two units to move independently of each other to some extent. Thus I am enabled to form a valve at one end of the inlet unit and to provide a seat for this valve in the casing. When the valve is on its seat it prevents the loss of air above referred to without interfering with the motion of the discharge unit, as the discharge unit is able to move to the extent permitted by the play between the two units without being interfered with by the seated and therefore stationary inlet valve, and is able to open the discharge ports from the brake cylinder and to regulate completely the pressure in the brake cylinder.

The subdivision of the regulating valve into two comparatively independent units is also advantageous in that it dispenses with the necessity of providing a common piston rod for the control piston and the piston valve, as shown in Fig. 1. The piston rod which extends through all parts connected therewith, brings about certain undesirable secondary effects one of which is the considerable friction of the piston valve $s$ on said rod and the other is a tendency of the rod to jam, due to inaccuracies of manufacture which tendency may be increased by the more or less onesided forces of the springs $F_1$ and $F_2$ acting on the piston rod. Instead of extending the rod connecting the two valve units, I provide springs and flexible joints for connecting one of said units, as a rule the exhaust unit, with said control piston, so that all parts of the mechanism, that is, the inlet and discharge units and the control piston are able to move without being compelled to move along the axis of a comparatively rigid piston rod, and each part is able to move in its own cylinder or liner without interference from other parts, even if such parts are not exactly co-axial.

Referring now to Fig. 2, the parts which have already been described with reference to Fig. 1 and are identical with these parts, are indicated by the same reference numerals and their description will not be repeated here.

The regulating valve $s$ illustrated in Fig. 1 has been subdivided into two piston valve units $s_1$ and $s_2$. The upper unit $s_1$ is the inlet unit which moves in a liner $L_1$ at the top of the casing D. The top of the casing is closed by a cap $e_1$ and a spring $e$ inserted in said cap exerts an axial downwardly directed thrust on the unit. An annular valve $b$ is formed at the lower end of the valve $s_1$ and adapted to cooperate with a seat $c$ in the casing which may consist of a washer of resilient material secured between the liner $L_1$ and a hollow nut $c_1$ screwed into the base of the casing. The liner $L_1$ is provided with ports 18 and 20, 20 which correspond to the ports $k$ and $x_1$, $x_2$ of Fig. 1, and have the same functions.

A piston rod $m$ is screwed into the unit $s_1$ at $n$, and a slot $f$ is formed in said rod connecting the spaces above and below said unit. This piston rod is provided with a collar $m'$ at its lower end, and this collar is inserted in the cavity of a cap nut 21 which is screwed into the top of the discharge unit $s_2$. This unit is adapted to be reciprocated in a liner 16 having ports $r$ and $t$ connected by a recess $r_1$ in the casing D, and an angular recess $u$ at its lower end. A passage $t_1$ in the unit $s_2$ connects the ports $t$ with the recess $u$. The nut $c_1$ is provided with a passage $g_1$ connected with the passage $g$ to the brake cylinder C and in the position of parts illustrated the brake cylinder is connected with the atmosphere by the passages $g$, $g_1$, the bore of the nut $c_1$, the ports $r$, the recess $r_1$, the recess $u$ and the passage $i$ in the wall of the casing. At the same time the unit $s_1$ closes the ports in the liner $L_1$ and prevents escape of compressed air from the brake cylinder through being held on its seat $c$ by the pressure of the spring $e$.

The seat of the collar $m'$ in the nut 21 of the discharge unit $s_2$ is spherical and the cavity of the cap nut surrounds the collar with some play, so that the two units are able to move independently of each other to the extent permitted by such play, which is some millimetres, and so the discharge unit $s_2$ is able to control the ports $r$, $t$ of its liner notwithstanding the fact that the unit $s_1$ is held on its seat $c$ and therefore stationary. The ports $r$ and $t$ are arranged in succession in order to improve the tight connection between the unit $s_2$ and the liner 16. A washer 13 may be inserted at the upper end of the liner 16, on which an angular valve $r_3$ at the upper end of the discharge unit $s_2$ may be seated.

A boss $s_3$ is formed at the lower end of the discharge unit $s_2$ and a pin $p_1$ of a spring plate $p$ is inserted in a conical bore of the boss $s_3$ with its point $p_1$ and held against axial movement therein by a split ring $p_2$ or any other suitable means. A spring $F_{11}$ corresponding to the spring $F_1$ in Fig. 1 is inserted between the spring plate $p$ and a spring plate $q$, and a spring $F_{21}$ corresponding to the spring $F_2$ in Fig. 1 are inserted between these plates 2 and a shoulder in the casing D at the end of the liner 16.

The casing $D_2$ with its chamber R and the control piston is secured at a flange at the base of the casing D, as in Fig. 1, but in this case the rod $d_1$ of the piston extends only as far as the plate $q$, and there is no spring below the piston as in Fig. 1, the function of this spring being performed by the spring $F_{21}$. A washer 14 is secured between the flanges of the casings D and $D_2$, forming a seat for the control piston. The piston rod $d_1$ passes through a packing $d_{11}$ in the base plate of the casing D and is connected with the plate $q$ by a spherical head $d_{12}$.

It will be understood that by these means a flexible and resilient connection is provided between the control piston $K_1$ and the regulating valve constituted by the units $s_1$ and $s_2$ and that such units themselves are connected so as to move independently.

The function of this modified device as well as that illustrated in Fig. 3 will be understood from the description of Fig. 1.

Referring now to Fig. 3, this is distinguished from the modification shown in Fig. 2 in that the discharge units $s_{22}$, instead of controlling passages in a liner, is provided with a discharge valve 10. The discharge unit $s_{22}$ moves in a cylinder at the end of the casing D and is held tight by a packing 1 without a liner. A partition 12 is arranged at the bottom of the cylinder and the boss $s_{33}$ of the unit $s_{22}$ extends through a hole of the centre of the partition 12, some clearance being provided for allowing the air from the brake cylinder C and the valve 10 to escape through a passage $i_1$ in a sleeve $D_4$ which is inserted between the casings D and $D_2$ and the partition 12 is held in a shoulder at the upper end of said sleeve. A spring 11 tends to hold the valve 10 at its seat but the valve is opened by its spindle being arrested by the partition 12 on the downward motion of the unit $s_{22}$. When the unit $s_{22}$ is at the bottom of its stroke as shown in Fig. 3, the valve too is opened. The connection of the regulating valve constituted by the units $s_{11}$ and $s_{22}$ with the control piston $K_1$ through the medium of the springs $F_{11}$ and $F_{21}$, and the plates $p$ and $q$ is the same as described with reference to Fig. 2 and the function of parts is also the same as in this figure, apart from the modified construction of the discharge unit $s_{22}$. The connection of the two units $s_{11}$ and $s_{22}$ is also slightly different as the head $o$ of the rod $m$ is inserted in the discharge unit $s_{22}$ by a connection similar to a bayonet joint.

Instead of constructing a discharge unit $s_2$ as a piston, it might be constructed as a diaphragm in which the valve 10 is secured and controlled by a fixed check like the partition 12.

In both modifications, as mentioned, the equalizing piston K of Fig. 1 is dispensed with and the difference of pressures above and below the control piston $K_1$ is constituted by the pressure in the chamber R below the control piston, said chamber being charged with compressed air as described in connection with Fig. 1, and the variable pressure in the pipe system, said system being connected with the space above the control piston $K_1$ by a passage similar to the passage $o$ in Fig. 1. These passages and connections are not shown in Figs. 2 and 3. The difference of the initial pressure below the control piston $K_1$ and the variable pressure above said piston is exclusively balanced by the sum of the forces of the springs $F_{11}$ and $F_{21}$, as the pressure of the spring $F_1$ is not absorbed by the equalizing piston K, as in Fig. 1.

The annular valve $b$ at the bottom of the inlet $s_1$ is of maximum possible diameter, which is about one tenth of a millimetre smaller than the diameter of the unit $s_1$, its annular face being as narrow as possible. The pressure exerted by the spring $e$ is but small because when the brake is applied, the pressure obtaining in the brake cylinder C is transferred to the upper end of the unit by means of the slot $f$ in the rod $m$, the more so because the diameter of the upper end of the inlet unit is somewhat greater than the diameter of the annular valve $b$, and so there is even a small excess pressure in the favour of the spring $e$. At the same time the spring $e$ tends to hold the lower face of the collar $m'$ against the unit $s_2$ or $s_{22}$, so that the two units are held engaged until the unit $s_1$ has been seated. So, when the inlet unit has closed the port 18 and so prevents further inflow of compressed air to the brake cylinder, the annular valve $b$ will be seated on the washer $c$ so that undesired flow of air from the auxiliary reservoir B to the brake cylinder C is impossible. Notwithstanding the seating of the unit $s_1$, the discharge unit is free to move and to control the ports $r$ and $t$ of the valve 10, as the case may be, due to the play of the unit with regard to the collar $m'$, as described.

Dividing the regulating valve into two units $s_1$ and $s_2$ or $s_1$ and $s_{22}$, as the case may be, permits the diameter of the inlet unit to be reduced as compared with that of the discharge unit and so leakage losses are eliminated. This stepped construction of the regulating valve has no influence on the pressures since the pressures on both ends of the unit $s_1$ are balanced by the slot $f$ in the rod $m$.

These springs $F_{21}$ may be dispensed with altogether by suitably proportioning the diameters of the control piston $K_1$ and the discharge unit $s_2$ or $s_{22}$. Assuming that the diameter of $K_1$ is 100 mms. and the diameter of $s_2$ or $s_{22}$ is 60 mms. and the maximum pressure in the brake cylinder is 3.7 atmospheres for a reduction of 1.3 atmospheres in the pipe system, the pressure on the piston $K_1$ will be $$\frac{10^2\pi}{4}1.3 = 102 \text{ kg.}$$

and the pressure on the discharge unit $s_2$ will be $$\frac{6^2\pi}{4}3.7 = 105 \text{ kg.}$$

Both pressures, therefore, are practically balanced and the spring $F_2$ becomes unnecessary.

My improved valve may also be adapted for example in connection with the Westinghouse brake so as to render it retrogressively adjustable. To attain this, the inlet unit is dispensed with and the valve is connected to the exhaust port of the Westinghouse valve. In this case, my valve regulates only the discharge and renders the brake retrogressively adjustable so that it responds to whatever pressure may be obtained in the pipe system.

I wish it to be understood that I do not desire to be limited to any details of construction shown and described, for obvious modifications will occur to a person skilled in the art.

I claim:

1. Compressed-air brake comprising a brake cylinder, a valve casing, a valve in said casing adapted to regulate the flow of compressed air to and from said brake cylinder, a control valve operatively connected with said regulating valve and means for so operating said control valve as to place said regulating valve in a definite position for any combination of initial pressure in the pipe system, existing pressure in the pipe system and pressure in the brake cylinder, independently of said initial pressure.

2. Compressed-air brake comprising a brake cylinder, a valve casing, a valve in said casing adapted to regulate the flow of compressed air to and from said brake cylinder, a control valve operatively connected with said regulating valve, means for so operating said control valve as to place said regulating valve in a definite position for any combination of initial pressure in the pipe system, existing pressure in the pipe system and pressure in the brake cylinder, independently of said initial pressure and a resilient connection between said regulating and control valve.

3. Compressed-air brake comprising a brake cylinder, a valve casing, a valve in said casing adapted to regulate the flow of compressed air to and from said brake cylinder, a control valve operatively connected with said regulating valve, means for so operating said control valve as to place said regulating valve in a definite position for any combination of initial pressure in the pipe system, existing pressure in the pipe system and pressure in the brake cylinder, independently of said initial pressure and a resilient connection between said regulating and control valves, said regulating valve being adapted to be returned to its initial position by the pressure in said brake cylinder.

4. Compressed-air brake comprising a brake cylinder, a valve casing, a valve in said casing adapted to regulate the flow of compressed air to and from said brake cylinder, a cylinder in said casing and a control piston in said cylinder operatively connected with said regulating valve, one end of said cylinder being connected with the pipe system.

5. Compressed-air brake comprising a brake cylinder, a valve casing, a valve in said casing adapted to regulate the flow of compressed air to and from said brake cylinder, a cylinder in said casing and a control piston in said cylinder operatively connected with said regulating valve, one end of said cylinder being connected with the pipe system and its other end being adapted to be charged with air under the initial pressure in said system.

6. Compressed-air brake comprising a brake cylinder, an auxiliary reservoir, a valve casing, a valve in said casing adapted to regulate the flow of compressed air from said reservoir to said brake cylinder and the discharge of compressed air from said brake cylinder, a cylinder in said casing, a control piston in said cylinder operatively connected with said regulating valve, one end of said cylinder being connected with the pipe system, and a pipe line connecting the other end of said cylinder with said auxiliary reservoir.

7. Compressed-air brake comprising a brake cylinder, an auxiliary reservoir, a valve casing, a valve in said casing adapted to regulate the flow of compressed air from said reservoir to said brake cylinder and the discharge of compressed air from said brake cylinder, a cylinder in said casing, a control piston in said cylinder operatively connected with said regulating valve, one end of said cylinder being connected with the pipe system, and a pipe line comprising a non-return valve and connecting the other end of said cylinder with said auxiliary reservoir.

8. Compressed-air brake comprising a brake cylinder, a valve casing, a valve in said casing adapted to regulate the flow of compressed air to and from said brake cylinder, a cylinder in said casing, a control piston in said cylinder operatively connected with said regulating valve, one end of said cylinder being connected with the pipe system, and a packing in said control piston adapted to permit flow of air from said connected end of said cylinder, but to check the flow in opposite direction.

9. Compressed-air brake comprising a brake cylinder, a valve casing, a cylinder in said casing connected with said brake cylinder, a piston and a piston valve operatively connected with said piston, both said piston valve and said piston being adapted to reciprocate in said cylinder and to regulate the flow of compressed air to and from said brake cylinder, a second cylinder in said casing connected with the pipe system at one end and adapted to be charged with air under pressure at the other end, and a piston in said second cylinder which is positively connected with said piston in said first cylinder.

10. Compressed-air brake comprising a brake cylinder, a valve casing, a cylinder in said casing connected with said brake cylinder, a piston and a piston valve operatively connected with said piston, both said piston valve and said piston being adapted to reciprocate in said cylinder and to regulate the flow of compressed air to and from said brake cylinder, a second cylinder in said casing connected with the pipe system at one end and adapted to be charged with air under pressure at the other end, a piston in said second cylinder which is positively connected with said piston in said first cylinder, an a spring inserted between said piston in said first cylinder and said piston valve.

11. Compressed-air brake comprising a brake cylinder, a valve casing, a cylinder in said casing connected with said brake cylinder, a piston and a piston valve operatively connected with said piston, both said piston valve and said piston being adapted to reciprocate in said cylinder and to regulate the flow of compressed air to and from said brake cylinder, a second cylinder in said casing connected with the pipe system at one end and adapted to be charged with air under pressure at the other end, a piston in said second cylinder which is positively connected with said piston in said first cylinder and a spring inserted between said piston in said second cylinder and that end of said cylinder which is adapted to be charged with air under pressure.

12. Compressed air brake comprising two co-axial cylinders, a brake cylinder connected with one of said cylinders, a liner in said cylinder defining two sets of ports for the air flowing to and from said brake cylinder, a piston adapted to reciprocate in said liner and to control one set of ports, a piston valve operatively connected with said piston to reciprocate in said liner and adapted to control the other set of ports, a spring inserted between said piston and said piston valve, a piston in said second cylinder, said piston being positively connected with the piston in said first cylinder, a pipe line connected with the pipe system and one end of said second cylinder, and means for charging the other end of said cylinder with air under pressure.

13. Compressed-air brake comprising a brake cylinder, a casing connected with said brake cylinder, a cylinder in said casing, a regulating valve adapted to reciprocate in said cylinder and to control the flow of air to and from said brake cylinder, a cylinder arranged coaxially with said regulating valve cylinder, said second cylinder being connected with the pipe system at one end and adapted to be charged with air under pressure at the other end, and a piston in said second cylinder which is operatively connected with said regulating valve.

14. Compressed-air brake comprising a brake cylinder, a casing connected with said brake cylinder, a cylinder in said casing, a regulating valve adapted to reciprocate in said cylinder, said regulating valve being subdivided into two units, one of which is adapted to regulate the inlet of compressed air to, and the other one of which is adapted to regulate the discharge of compressed air from said brake cylinder, a positive connection between said units, a second cylinder arranged coaxially with said regulating valve cylinder, said second cylinder being connected with the pipe system at one end and adapted to be charged with air under pressure at the other end, and a piston in said second cylinder which is operatively connected with said regulating valve.

15. Compressed-air brake comprising a brake cylinder, a casing connected with said brake cylinder, a cylinder in said casing, a regulating valve adapted to reciprocate in said cylinder, said regulating valve being subdivided into two units, one of which is adapted to regulate the inlet of compressed air to, and the other one of which is adapted to regulate the discharge of compressed air from said brake cylinder, a connection between said two units which is positive but permits said units some play with regard to each other, a second cylinder arranged coaxially with said regulating valve cylinder, said second cylinder being connected with the pipe system at one end and adapted to be charged with air under pressure at the other end, and a piston in said second cylinder which is operatively connected with said regulating valve.

16. Compressed air brake comprising a brake cylinder, a casing connected with said brake cylinder, a cylinder in said casing, a regulating valve adapted to reciprocate in said cylinder and to control the flow of air to and from said brake cylinder, a cylinder arranged coaxially with said regulating valve cylinder, said second cylinder being connected with the pipe system at one end and adapted to be charged with air under pressure at the other end, a piston in said second cylinder and a spring interposed between said piston in said second cylinder and said regulating valve.

17. Compressed-air brake comprising a brake cylinder, a casing connected with said brake cylinder, a cylinder in said casing, a regulating valve adapted to reciprocate in said cylinder and to control the flow of air to and from said brake cylinder, a cylinder arranged coaxially with said regulating valve cylinder, said second cylinder being connected with the pipe system at one end and adapted to be charged with air under pressure at the other end, a piston in said second cylinder, a spring interposed between said piston in said second cylinder and said regulating valve, and a spring interposed between said piston and said casing and tending to counteract the pressure in that end of said cylinder which is adapted to be charged with air under pressure.

18. Compressed-air brake comprising a brake cylinder, a casing connected with said brake cylinder, a cylinder in said casing, a regulating valve adapted to reciprocate in said cylinder and to control the flow of air to and from said brake cylinder, a cylinder arranged coaxially with said regulating valve cylinder, said second cylinder being connected with the pipe system at one end and adapted to be charged with air under pressure at the other end, a piston in said second cylinder, a spring interposed between said piston in said second cylinder and said regulating valve, and a spring interposed between said piston and said casing and tending to counteract the pressure in that end of said cylinder which is adapted to be charged with air under pressure, said springs being arranged one within the other.

19. Compressed-air brake comprising a brake cylinder, a casing connected with said brake cylinder, a cylinder in said casing, a regulating valve adapted to reciprocate in said cylinder, said regulating valve being subdivided into two units, one of which is adapted to regulate the inlet of compressed air to, and the other one of which is adapted to regulate the discharge of compressed air from said brake cylinder, a connection between said two units which is positive but permits said units some play with regard to each other, a seat of resilient material for one end of said inlet unit in said casing, a second cylinder arranged coaxially with said regulating valve cylinder, said second cylinder being connected with the pipe system at one end and adapted to be charged with air under pressure at the other end, and a piston in said second cylinder which is operatively connected with said regulating valve.

20. Compressed-air brake comprising a brake cylinder, a casing connected with said brake cylinder, a cylinder in said casing, a regulating valve adapted to reciprocate in said cylinder, said regulating valve being subdivided into two units, one of which is adapted to regulate the inlet of compressed air to, and the other one of which is adapted to regulate the discharge of compressed air from said brake cylinder, a connection between said two units which is positive but permits said units some play with regard to each other, a seat of resilient material for one end of said inlet unit in said casing, a cylinder arranged coaxially with said regulating valve cylinder, said second cylinder being connected with the pipe system at one end and adapted to be charged with air under pressure at the other end, a piston in said second cylinder which is operatively connected with said regulating valve, and a seat of resilient material for said piston in said casing.

21. Compressed-air brake comprising a brake cylinder, a casing connected with said brake cylinder, a cylinder in said casing, a regulating valve adapted to reciprocate in said cylinder, said regulating valve being subdivided into two units of different diameter, one of which, of small diameter, is adapted to regulate the inlet of compressed air to, and the other one of which, of larger diameter, is adapted to regulate the discharge of compressed air from, said brake cylinder, and means for operating said regulating valve in accordance with the pressure in the pipe system.

22. Compressed-air brake comprising a brake cylinder, a casing connected with said brake cylinder, a cylinder in said casing, a regulating valve adapted to reciprocate in said cylinder, said regulating valve being subdivided into two units, one of which is adapted to regulate the inlet of compressed air to, and the other one of which is adapted to regulate the discharge of compressed air from said brake cylinder, said discharge unit defining discharge passages arranged in succession, a positive connection between said units, a second cylinder arranged coaxially with said regulating valve cylinder, said second cylinder being connected with the pipe system at one end and adapted to be charged with air under pressure at the other end, and a piston in said second cylinder which is operatively connected with said regulating valve.

23. Compressed-air brake comprising a brake cylinder, a casing connected with said brake cylinder, a cylinder in said casing, a regulating valve adapted to reciprocate in said cylinder, said regulating valve being subdivided into two units, one of which is adapted to regulate the inlet of compressed air to, and the other one of which is adapted to regulate the discharge of compressed air from said brake cylinder, a valve in said discharge unit, means for automatically seating said valve, a check adapted to open said valve in one of the end positions of said discharge unit, a positive connection between said units, a second cylinder arranged coaxially with said regulating valve cylinder, said second cylinder being connected with the pipe system at one end and adapted to be charged with air under pressure at the other end, and a piston in said second cylinder which is operatively connected with said regulating valve.

24. Compressed-air brake comprising a brake cylinder, a casing connected with said brake cylinder, a cylinder in said casing, a regulating valve adapted to reciprocate in said cylinder and to regulate the inlet of comprssed air to said brake cylinder, a diaphragm at the end of said cylinder, a valve in said diaphragm adapted to regulate the discharge of compressed air from said brake cylinder, automatic means for operating said valve, a second cylinder arranged coaxially with said regulating valve cylinder, said second cylinder being connected with the pipe system at one end and adapted to be charged with air under pressure at the other end, and a piston in said second cylinder which is operatively connected with said regulating valve.

25. Compressed-air brake comprising a brake cylinder, a casing connected with said brake cylinder, a cylinder in said casing, a regulating valve adapted to reciprocate in said cylinder, said regulating valve being subdivided into two units, one of said units being adapted to regulate the inlet of compressed air to said brake cylinder, means for equalizing the pressure on both sides of said inlet unit, the other unit being adapted to regulate the discharge of compressed air from said brake cylinder, and means for operating said regulating valve in accordance with the pressure in the pipe system.

26. Valve comprising two units, one of which is adapted to regulate the flow of a fluid under pressure to, and the other of which is adapted to regulate the flow of such fluid from, a reservoir, means for connecting said units so as to permit limited relative displacement of one unit with regard to the other, and means controlled by the fluid so regulated for operating said units.

27. Valve comprising two units, one of which is adapted to regulate the flow of a fluid under pressure to, and the other of which is adapted to regulate the flow of such fluid from, a reservoir, means for connecting said units so as to permit limited relative displacement of one unit with regard to the other, means controlled by the fluid so regulated for operating said units, and flexible and resilient connection between said means for operating said units.

In testimony whereof I affix my signature.

IVAR DROLSHAMMER.